US010666045B2

(12) United States Patent
Gemin et al.

(10) Patent No.: US 10,666,045 B2
(45) Date of Patent: May 26, 2020

(54) SYSTEM FOR SELECTIVELY COUPLING AN ENERGY SOURCE TO A LOAD AND METHOD OF MAKING SAME

(71) Applicant: General Electric Company, Niskayuna, NY (US)

(72) Inventors: Paul Robert Gemin, Niskayuna, NY (US); Robert Dean King, Schenectady, NY (US); Irene Michelle Berry, Schenectady, NY (US); Lembit Salasoo, Schenectady, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 133 days.

(21) Appl. No.: 14/728,738

(22) Filed: Jun. 2, 2015

(65) Prior Publication Data

US 2015/0263517 A1    Sep. 17, 2015

Related U.S. Application Data

(63) Continuation of application No. 13/283,748, filed on Oct. 28, 2011, now Pat. No. 9,073,438.

(51) Int. Cl.
*B60L 1/00* (2006.01)
*H02J 7/00* (2006.01)
(Continued)

(52) U.S. Cl.
CPC ............ *H02J 1/00* (2013.01); *B60L 7/14* (2013.01); *B60L 15/2009* (2013.01);
(Continued)

(58) Field of Classification Search
USPC .................................. 307/10.1, 66
See application file for complete search history.

(56) References Cited

U.S. PATENT DOCUMENTS 5,373,195 A    12/1994  De Doncker et al.
5,710,699 A     1/1998  King et al.
(Continued)

FOREIGN PATENT DOCUMENTS

CN    101237154 A    8/2008
CN    101370685 A    2/2009
EP      2179882 A2   4/2010

OTHER PUBLICATIONS

Chinese Office Action issued in connection with corresponding CN Application No. 201210414745.3 dated Aug. 24, 2015.
(Continued)

*Primary Examiner* — Rexford N Barnie
*Assistant Examiner* — Dru Parries
(74) *Attorney, Agent, or Firm* — Meagher Emanuel Laks Goldberg & Liao, LLP

(57) ABSTRACT

A multi-energy storage device system includes an electric drive coupled to a load, a DC link coupled to the electric drive, and a bi-directional voltage converter having an output channel coupled to the DC link and an input channel. A first energy storage device (ESD) is coupled to the input channel, and a switch is coupled to the DC link and to a second ESD. A system controller causes the switch to couple the second ESD to the DC link for delivering energy stored in the second ESD to the electric drive. The system controller also causes the voltage converter to convert a voltage of the first ESD to a higher voltage and to deliver the higher voltage to the DC link, wherein the higher voltage is greater than the voltage of the second ESD and causes the switch to decouple the second ESD from the DC link.

29 Claims, 3 Drawing Sheets

(51) Int. Cl.
*H02J 9/00* (2006.01)
*H02J 1/00* (2006.01)
*B60L 7/14* (2006.01)
*B60L 15/20* (2006.01)
*B60L 50/40* (2019.01)
*B60L 50/30* (2019.01)
*B60L 50/51* (2019.01)
*B60L 58/40* (2019.01)
*H02M 3/00* (2006.01)

(52) U.S. Cl.
CPC .............. *B60L 50/30* (2019.02); *B60L 50/40* (2019.02); *B60L 50/51* (2019.02); *B60L 58/40* (2019.02); *H02J 7/00* (2013.01); *H02M 3/00* (2013.01); *B60L 2200/22* (2013.01); *B60L 2200/36* (2013.01); *B60L 2200/42* (2013.01); *B60L 2210/12* (2013.01); *B60L 2210/14* (2013.01); *B60L 2220/46* (2013.01); *B60L 2240/421* (2013.01); *H02J 2207/20* (2020.01); *Y02T 10/642* (2013.01); *Y02T 10/645* (2013.01); *Y02T 10/7022* (2013.01); *Y02T 10/7225* (2013.01); *Y02T 10/7233* (2013.01); *Y02T 10/7275* (2013.01); *Y02T 90/34* (2013.01); *Y10T 29/4902* (2015.01); *Y10T 29/49117* (2015.01); *Y10T 307/50* (2015.04); *Y10T 307/685* (2015.04)

(56) References Cited

U.S. PATENT DOCUMENTS

| | | | |
|---|---|---|---|
| 5,903,449 A | 5/1999 | Garrigan et al. | |
| 6,331,365 B1 | 12/2001 | King | |
| 6,441,581 B1 | 8/2002 | King et al. | |
| 6,737,822 B2 | 5/2004 | King | |
| 7,049,792 B2 | 5/2006 | King | |
| 7,489,048 B2 | 2/2009 | King et al. | |
| 7,932,633 B2 | 4/2011 | King et al. | |
| 7,952,223 B2 | 5/2011 | Masson et al. | |
| 8,030,884 B2 | 10/2011 | King et al. | |
| 8,080,973 B2 | 12/2011 | King et al. | |
| 8,378,623 B2 | 2/2013 | Kusch et al. | |
| 8,400,111 B2 | 3/2013 | Ranier et al. | |
| 8,415,824 B2 | 4/2013 | Chemin et al. | |
| 8,475,328 B2 | 7/2013 | Rouis et al. | |
| 8,698,451 B2 | 4/2014 | King et al. | |
| 8,803,486 B2 * | 8/2014 | Norimatsu | H02M 1/36 307/10.1 |
| 9,290,097 B2 | 3/2016 | Steigerwald et al. | |
| 2005/0040789 A1 | 2/2005 | Salasoo et al. | |
| 2005/0122071 A1 | 6/2005 | King et al. | |
| 2005/0284676 A1 | 12/2005 | King et al. | |
| 2007/0158118 A1 | 7/2007 | King | |
| 2007/0164693 A1 | 7/2007 | King et al. | |
| 2008/0276824 A1 | 11/2008 | King et al. | |
| 2008/0277101 A1 | 11/2008 | Kumar et al. | |
| 2010/0089547 A1 | 4/2010 | King et al. | |
| 2010/0090525 A1 | 4/2010 | King et al. | |
| 2010/0090626 A1 | 4/2010 | King et al. | |
| 2010/0133900 A1 | 6/2010 | King et al. | |
| 2010/0133912 A1 | 6/2010 | King et al. | |
| 2010/0136379 A1 | 6/2010 | King et al. | |
| 2010/0187024 A1 | 7/2010 | Tang | |
| 2010/0235025 A1 | 9/2010 | Richter | |
| 2010/0276993 A1 | 11/2010 | King et al. | |
| 2011/0316345 A1 | 12/2011 | King et al. | |
| 2012/0013184 A1 * | 1/2012 | Kato | B60K 6/445 307/9.1 |
| 2012/0245772 A1 | 9/2012 | King et al. | |
| 2012/0019073 A1 | 11/2012 | Huber et al. | |
| 2013/0038127 A1 | 2/2013 | King et al. | |

OTHER PUBLICATIONS

First office action and Search issued in connection with corresponding CN Application No. 201710024810.4 dated Nov. 13, 2018.

* cited by examiner

SYSTEM FOR SELECTIVELY COUPLING AN ENERGY SOURCE TO A LOAD AND METHOD OF MAKING SAME

BACKGROUND

Embodiments of the invention relate generally to drive systems and, more specifically, to selectively coupling an energy source to a load to supply energy thereto in a vehicle or non-vehicle system.

Electric vehicles and hybrid electric vehicles are typically powered by one or more energy storage devices, either alone or in combination with an internal combustion engine. In pure electric vehicles, the one or more energy storage devices powers the entire drive system, thereby eliminating the need for an internal combustion engine. Hybrid electric vehicles, on the other hand, include energy storage device power to supplement power supplied by an internal combustion engine, which greatly increases the fuel efficiency of the internal combustion engine and of the vehicle. Traditionally, the energy storage devices in electric or hybrid electric propulsion systems include batteries, ultracapacitors, flywheels, or a combination of these elements in order to provide sufficient energy to power an electric motor.

When two or more energy sources are used to provide power to drive system, the energy sources are typically well-suited to provide different types of power. A first energy source, for example, may be a high specific energy source that is more efficient or economical at providing long-term power while a second energy source may be a high specific-power source more efficient at providing short-term power. The high specific-power source may be used to assist the high specific energy source in providing power to the system during, for example, acceleration or pulsed load events.

Often, the high specific-power source is directly coupled to the direct current (DC) link that supplies a voltage to a load. However, control of the DC link voltage is dependent on the directly coupled high power source and can be lower than a desired response. In addition, the transient power required from the high energy source to be supplied to the DC link can be higher than a desired response.

Therefore, it is desirable to provide a system that allows selective coupling of an energy source to a load to supply energy thereto.

BRIEF DESCRIPTION OF THE INVENTION

In accordance with one aspect of the invention, a multi-energy storage device system includes an electric drive coupled to a load, a DC link coupled to the electric drive, and a bi-directional voltage converter having an output channel coupled to the DC link and an input channel. A first energy storage device is coupled to the input channel of the voltage converter, a switch is coupled to the DC link, and a second energy storage device is coupled to the switch. A system controller is configured to cause the switch to couple the second energy storage device to the DC link such that energy stored in the second energy storage device is delivered to the electric drive and such that a voltage of the second energy storage device is reduced as the energy stored therein is delivered to the electric drive. The system controller also causes the bi-directional voltage converter to convert a voltage of the first energy storage device to a higher voltage and to deliver the higher voltage to the DC link, wherein the higher voltage is greater than the voltage of the second energy storage device and causes the switch to decouple the second energy storage device from the DC link.

In accordance with another aspect of the invention, a method of assembling a propulsion energy system includes coupling an output channel of a bi-directional voltage converter assembly to a direct current (DC) link and coupling a first energy storage device to a first input channel of the bi-directional voltage converter assembly. The bi-directional voltage converter assembly includes a first bi-directional voltage converter. The method also includes coupling a switch to the DC link, coupling second energy storage device to the switch, and coupling a load to the DC link. The load is configured to receive energy from one of the first energy storage device and the second energy storage device via the DC link. The method further includes coupling a controller to the bi-directional voltage converter assembly and to the switch and configuring the controller to cause the switch to couple the second energy storage device to the DC link such that energy stored in the second energy storage device is delivered to the load and such that a voltage of the second energy storage device is reduced as the energy stored therein is delivered to the load. The controller is also configured to cause the bi-directional voltage converter to convert a voltage of the first energy storage device to a higher voltage and to deliver the higher voltage to the DC link, wherein the higher voltage is greater than the voltage of the second energy storage device and causes the switch to decouple the second energy storage device from the DC link.

In accordance with another aspect of the invention, a non-transitory computer readable storage medium having a computer program stored thereon and representing a set of instructions that when executed by a computer causes the computer to activate a first switch to transfer a voltage stored in a second energy storage device to a direct current (DC) link coupled to a load such that the voltage stored in the second energy storage device is delivered to the load as a voltage of the second energy storage device is reduced. The instructions also cause the computer to control a bi-directional voltage converter to convert a first voltage of a first energy storage device to a second voltage and to deliver the second voltage to the DC link, wherein the second voltage is greater than the voltage of the second energy storage device and causes the first switch to deactivate.

Various other features and advantages will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION

Embodiments of the invention relate to vehicle and non-vehicle applications. Vehicular applications may include pure-electric or hybrid-electric vehicle applications in, for example, on-road and off-road vehicles, golf cars, neighborhood electric vehicles, forklifts, and utility trucks as examples. Non-vehicular applications may include non-vehicular types of loads including pumps, fans, winches, cranes, or other motor driven loads. While described with respect to the vehicular applications, embodiments of invention are not intended to be limited to such.

Figure 1:
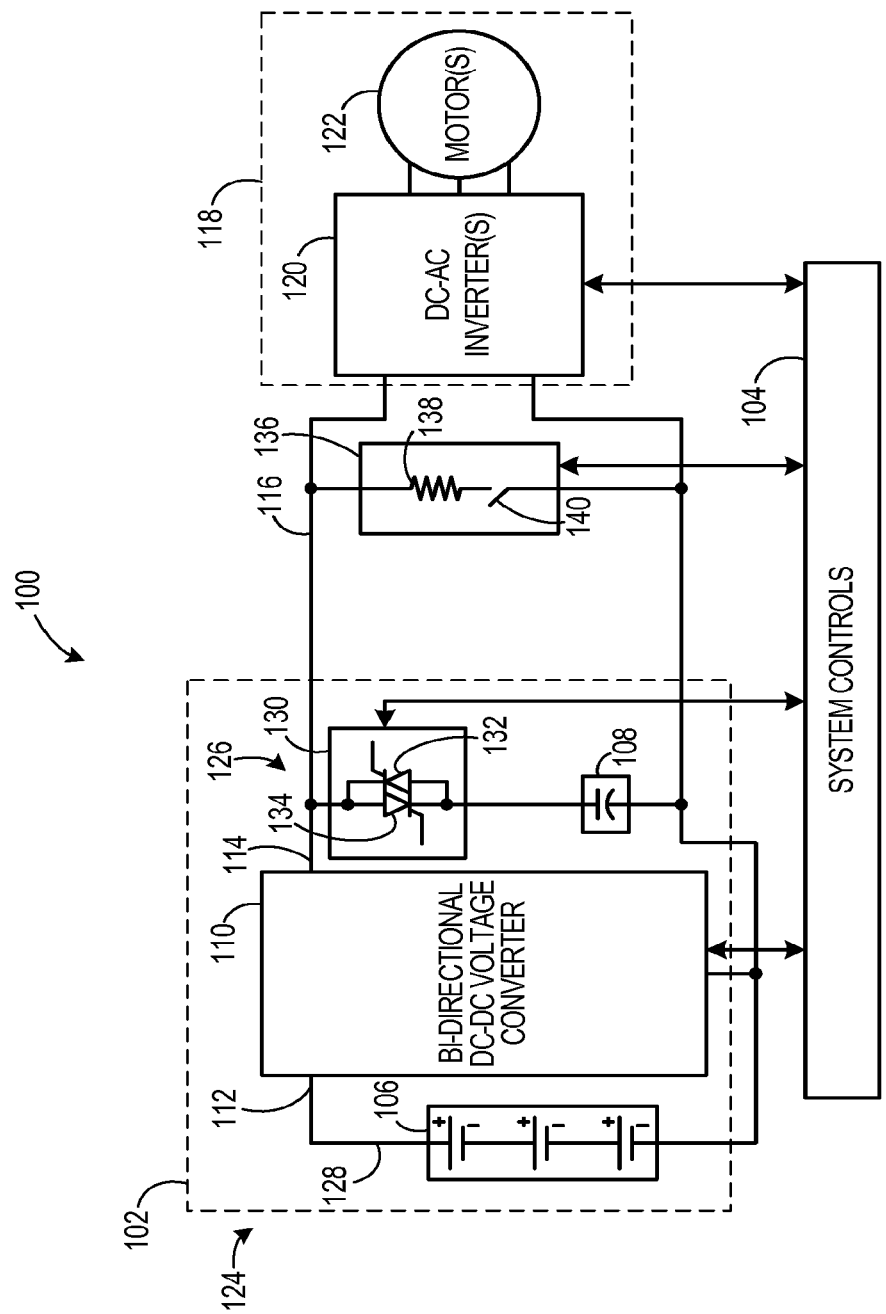
FIG. 1 schematically illustrates an embodiment of a propulsion system according to an embodiment of the invention.

FIG. 1 illustrates a propulsion system 100 according to an embodiment of the invention. Propulsion system 100 may be used in electric or hybrid vehicle applications. Vehicle propulsion system 100 includes an energy system 102 and a system controller 104. Energy system 102 includes a first energy storage device 106, a second energy storage device 108, and a bi-directional DC-DC voltage converter 110 having an input channel 112 coupled to first energy storage device 106 and having an output channel 114 coupled to a DC link 116. First energy storage device 106 may be used to provide longer-lasting energy while second energy storage device 108 may be used to provide higher-power energy for acceleration, for example. While first energy storage device 106 is illustrated as a battery, another type of energy storage devices such as an ultracapacitor, a fuel cell, a flywheel, or the like is also contemplated. While second energy storage device 108 is illustrated as an ultracapacitor, another type of energy storage devices such as a battery, a fuel cell, a flywheel, or the like is also contemplated.

First energy storage device 106 is coupled via DC link 116 to a load 118, which, according to an embodiment of the invention, is an electric drive including a DC-AC inverter 120 and a motor or electromechanical device 122. Motor 122 is preferably an AC motor but is not limited as such. While not shown, it is to be understood that each of a plurality of motors 122 may be coupled to a respective wheel or other load or that each motor 122 may be coupled to a differential for distributing rotational power to the wheels or other load.

Generally, in a motoring mode of operation, voltage converter 110 also acts to boost the voltage provided by a low voltage side 124 of energy system 102 to a high voltage side 126 of energy system 102. That is, voltage from first energy storage device 106 is provided to voltage converter 110 via a bus 128 coupled to input channel 112 thereof on the low voltage side 124 of energy system 102. The provided voltage is boosted by voltage converter 110 such that the voltage provided to DC link 116 on the high voltage side 126 of energy system 102 is increased to an operating level of electric drive 118. Electric drive 118 inverts the voltage on DC link 116 and provides the inverted voltage to electromechanical device 122.

In an accelerating mode of operation, energy from high-power second energy storage device 108 is generally desired to be used instead of or in addition to the voltage provided by first energy storage device 106 via voltage converter 110. Accordingly, propulsion system 100 includes a switch 130 configured to selectively couple and decouple second energy storage device 108 to/from DC link 116. Coupling second energy storage device 108 to DC link 116 allows second energy storage device 108 to discharge its stored energy to take advantage of the higher power available therefrom during acceleration. In one embodiment, second energy storage device 108 is an ultracapacitor in which its charge is affected by its voltage. Second energy storage device 108 preferably includes a plurality of series- and parallel-connected capacitor cells in this embodiment where each capacitor cell has a capacitance greater than 100 Farads per cell. Because the charge of second energy storage device 108 is affected by its voltage, as the voltage in the second energy storage device 108 is supplied to DC link 116, the charge of second energy storage device 108 reduces, thus reducing the voltage thereof. As the voltage of second energy storage device 108 reduces, the corresponding voltage on DC link 116 also reduces accordingly. While second energy storage device 108 is coupled to DC link 116 via switch 130, voltage converter 110 is not free to establish the voltage on DC link 116 without simultaneously charging second energy storage device 108. However, by decoupling second energy storage device 108 from DC link 116, voltage converter 110 is free to establish the voltage on DC link 116 without charging second energy storage device 108, which allows faster control of the voltage on DC link 116 and lowers the transient power supplied from first energy storage device 106.

Accordingly, during the accelerating mode operation, system controller 104 is programmed to close switch 130 to couple second energy storage device 108 to DC link 116. In one embodiment, system controller 104 is programmed to cause the voltage on DC link 116 to substantially match the state of charge or voltage of second energy storage device 108 prior to closing switch 130 such as, for example, by boosting the voltage from first energy storage device 106. In the illustrated embodiment, switch 130 includes a pair of silicon-controlled rectifiers (SCRs) 132, 134 coupled together and arranged in an anti-parallel arrangement. While a pair of SCRs is shown, it is contemplated that other switching devices as known in the art may be used. System controller 104 is thus programmed to activate SCR 132 (such as by applying a gate voltage thereto) such that voltage from second energy storage device 108 may be supplied to load 118 via DC link 116. Once activated, SCR 132 tends to remain in an "on" or closed state while current flowing therethrough remains above a holding current thereof.

When the acceleration is finished or when a state of charge or voltage of second energy storage device 108 falls to or below a threshold, for example, system controller 104 is programmed to cause switch 130 to change to an "off" or deactivated state to decouple second energy storage device 108 from DC link 116. To turn off SCR 132, the current flowing therethrough should be lowered to below its holding current. To accomplish this, system controller 104 is programmed to cause voltage converter 110 to boost the voltage of first energy storage device 106 to a voltage higher than the voltage of second energy storage device 108. Increasing the voltage on DC link 116 to a voltage higher than the voltage of second energy storage device 108 in this manner causes the current flowing through SCR 132 to fall below its holding current. As such, SCR 132 is caused to turn off, thus decoupling second energy storage device 108 from DC link 116.

In a decelerating mode of operation in which the speed of rotation of motor 122 is to be decreased to zero or to a lower speed from its current speed, system controller 104 is programmed to operate electric drive 118 in a regenerative mode (such as by operating electromechanical device 122 in a generator mode), wherein electric power or energy is returned to DC link 116 through DC-AC inverter 120 during a regenerative braking event. According to embodiments of the invention, system controller 104 causes the regenerative braking energy to be delivered to second energy storage device 108 via switch 130 to increase its state of charge or voltage. That is, system controller 104 is programmed to activate SCR 134 (such as by applying a gate voltage thereto) such that voltage from load 118 may be supplied to second energy storage device 108 via DC link 116. Similar to SCR 132, once activated, SCR 134 tends to remain in an "on" or closed state while current flowing therethrough remains above a holding current thereof.

When the deceleration is finished or when a state of charge or voltage of second energy storage device 108 rises to or above a threshold, for example, system controller 104 is programmed to cause switch 130 to change to an "off" or deactivated state to decouple second energy storage device 108 from DC link 116. To turn off SCR 134, the current flowing therethrough should be lowered to below its holding current. To accomplish this, in one embodiment, propulsion system 100 includes a dynamic retarder 136 coupled to DC link 116 that has a low-resistance resistor 138 and switch 140. System controller 104 is programmed to close or modulate switch 140 such that the current flowing through SCR 134 falls below its holding current. As such, SCR 134 turns off, thus decoupling second energy storage device 108 from DC link 116. System controller 104 may then open switch 140 to prevent current from continuing to flow through dynamic retarder 136.

In another embodiment, system controller 104 may cause voltage converter 110 to draw current from DC link 116 such that the current flowing through SCR 134 falls below its holding current. As such, SCR 134 is cause to turn off, thus decoupling second energy storage device 108 from DC link 116.

In another embodiment, DC-AC inverter 120 controls reduce the DC-AC inverter's DC output voltage to below that of energy storage device 108, thus causing SCR 134 to turn off and thus decoupling energy storage device 108 from DC link 116.

Closed loop power control may be used to determine the power split between the energy sources 106, 108, and (if present) dynamic retarder 136.

Figure 2:
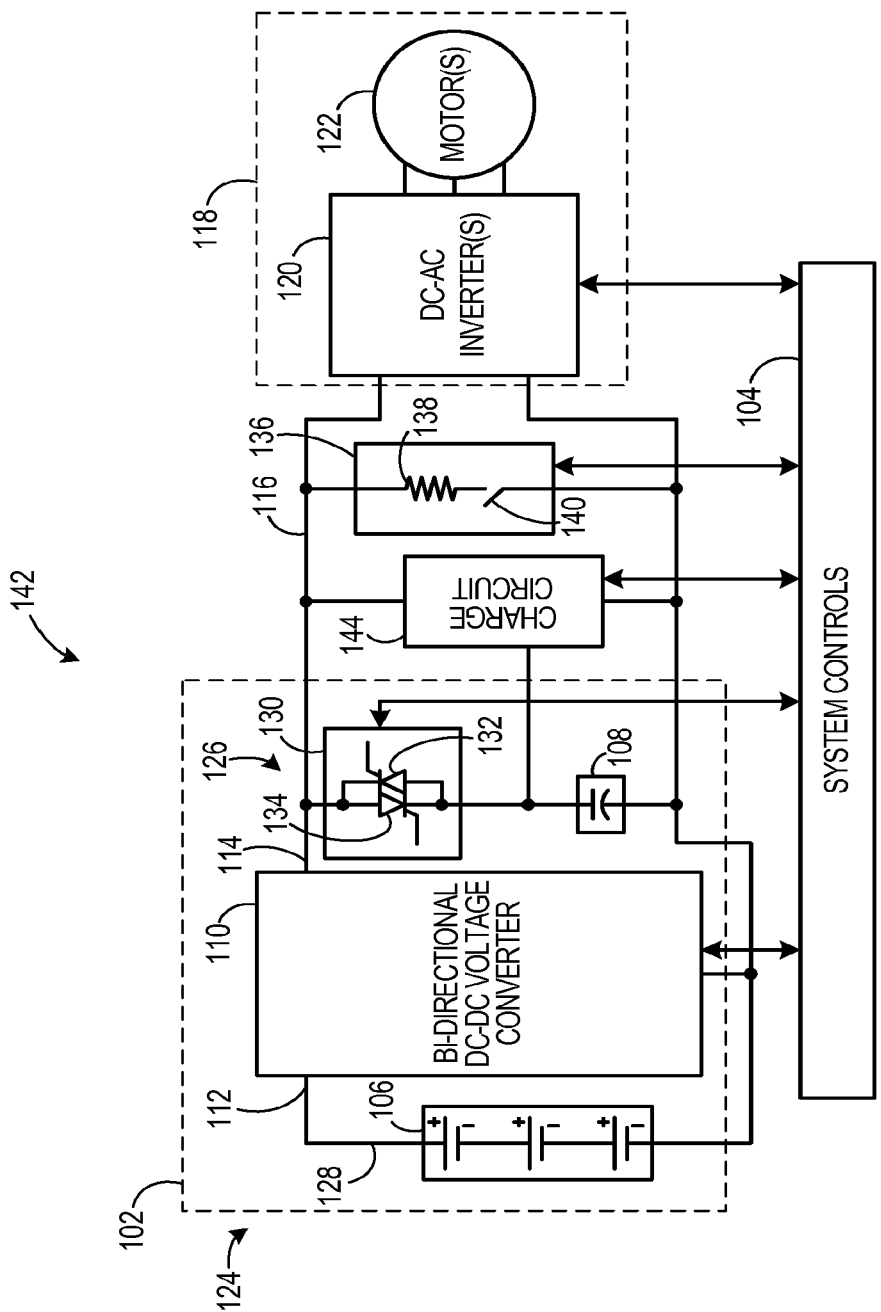
FIG. 2 schematically illustrates another embodiment of a propulsion system according to an embodiment of the invention.

FIG. 2 illustrates a propulsion system 142 according to another embodiment of the invention. Elements and components common to traction systems 100 and 142 will be discussed relative to the same reference numbers as appropriate.

In addition to components 102-140 common with propulsion system 100, propulsion system 142 includes a charge circuit 144 coupled to DC link 116 and coupled to second energy storage device 108. If second energy storage device 108 is decoupled from DC link 116, system controller 104 is programmed to cause charge circuit 144 to charge second energy storage device 108 from the voltage on DC link 116 such that the full state of charge or voltage of second energy storage device 108 may be reached. System controller 104 may optimize the charging of second energy storage device 108 such that the effect on first energy storage device 106 is minimized. Additionally, charge circuit 144 may be used during the regenerative braking event to charge second energy storage device 108 using a more controlled operation than merely causing SCR 134 to conduct and when there is a desire to maintain a higher DC link voltage than the present capacitor voltage. A preferred embodiment of charge circuit 144 would be a buck/boost converter allowing controlled charging of energy storage device 108 from a voltage below that of the DC link to a voltage above the DC link.

Figure 3:
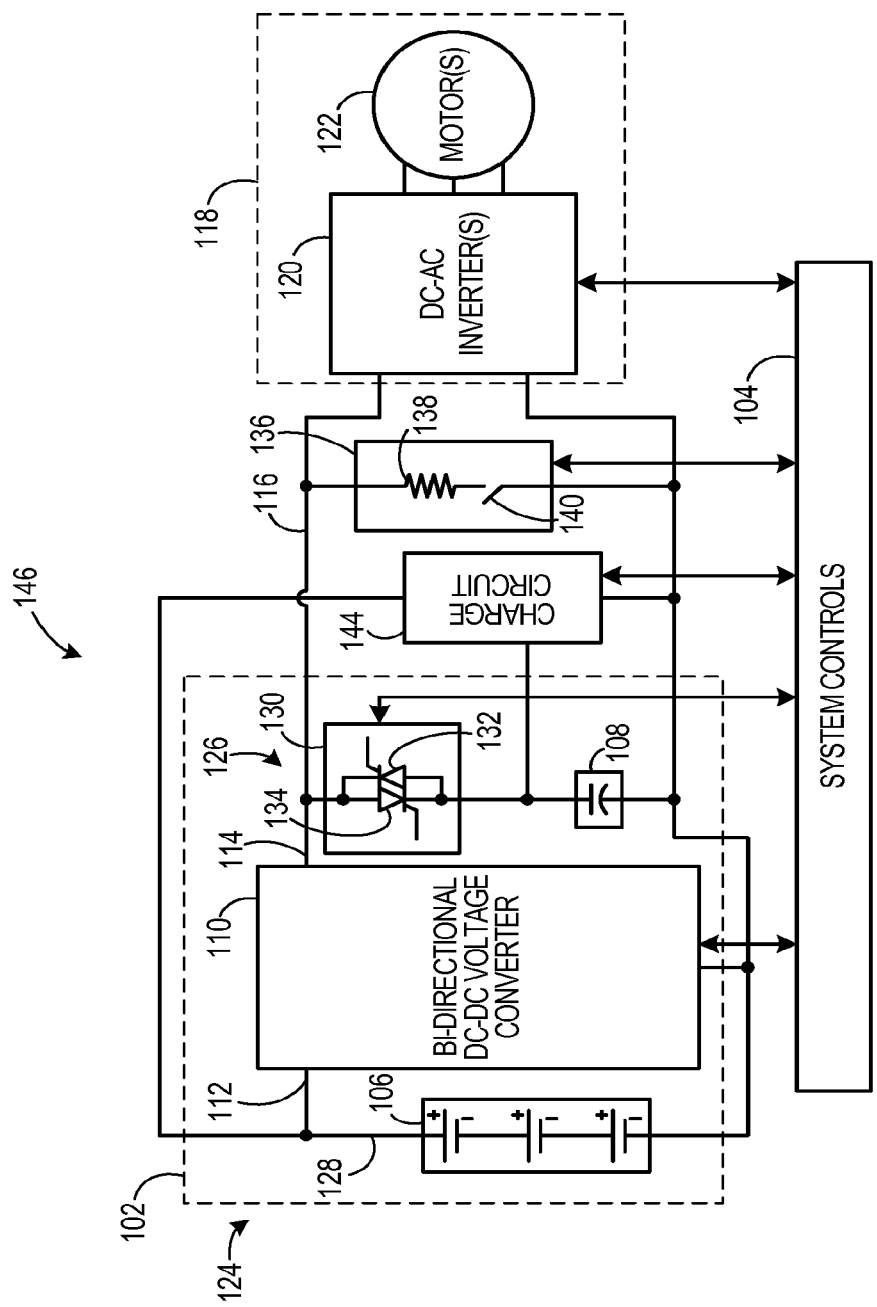
FIG. 3 schematically illustrates another embodiment of a propulsion system according to an embodiment of the invention.

FIG. 3 illustrates a propulsion system 146 according to another embodiment of the invention. Elements and components common to traction systems 100, 142, and 146 will be discussed relative to the same reference numbers as appropriate.

FIG. 3 shows that charge circuit 144 may be coupled directly to first energy storage device 106 rather than to DC link 116 as shown in FIG. 2. In this embodiment, the losses of the boost converter may be avoided during charging of storage device 108. A preferred embodiment utilizes boost or buck boost chargers to allow the voltage of storage device 108 to be charged from a voltage above or below that of storage device 106 to a voltage above that of storage device 106.

One skilled in the art will appreciate that system controller 104 may be implemented via a plurality of components such as one or more of electronic components, hardware components, and/or computer software components. These components may include one or more tangible computer readable storage media that generally stores instructions such as software, firmware and/or assembly language for performing one or more portions of one or more implementations or embodiments. Examples of a tangible computer readable storage medium include a recordable data storage medium and/or mass storage device. Such tangible computer readable storage medium may employ, for example, one or more of a magnetic, electrical, optical, biological, and/or atomic data storage medium. Further, such media may take the form of, for example, floppy disks, magnetic tapes, CD-ROMs, DVD-ROMs, hard disk drives, and/or electronic memory. Other forms of tangible computer readable storage media not listed may be employed with embodiments of the invention.

A number of such components can be combined or divided in an implementation of the systems described herein. Further, such components may include a set and/or series of computer instructions written in or implemented with any of a number of programming languages, as will be appreciated by those skilled in the art.

A technical contribution for the disclosed method and apparatus provides for a computer-implemented device capable of selectively coupling an energy source to a load to supply energy thereto in a vehicle or non-vehicle system.

Therefore, according to an embodiment of the invention, a multi-energy storage device system includes an electric drive coupled to a load, a DC link coupled to the electric drive, and a bi-directional voltage converter having an output channel coupled to the DC link and an input channel. A first energy storage device is coupled to the input channel of the voltage converter, a switch is coupled to the DC link, and a second energy storage device is coupled to the switch. A system controller is configured to cause the switch to couple the second energy storage device to the DC link such that energy stored in the second energy storage device is delivered to the electric drive and such that a voltage of the second energy storage device is reduced as the energy stored therein is delivered to the electric drive. The system controller also causes the bi-directional voltage converter to convert a voltage of the first energy storage device to a higher voltage and to deliver the higher voltage to the DC link, wherein the higher voltage is greater than the voltage of the second energy storage device and causes the switch to decouple the second energy storage device from the DC link.

According to another embodiment of the invention, a method of assembling a propulsion energy system includes coupling an output channel of a bi-directional voltage converter assembly to a direct current (DC) link and coupling a first energy storage device to a first input channel of the bi-directional voltage converter assembly. The bi-directional voltage converter assembly includes a first bi-directional voltage converter. The method also includes coupling a switch to the DC link, coupling second energy storage device to the switch, and coupling a load to the DC link. The load is configured to receive energy from one of the first energy storage device and the second energy storage device via the DC link. The method further includes coupling a controller to the bi-directional voltage converter assembly and to the switch and configuring the controller to cause the switch to couple the second energy storage device to the DC link such that energy stored in the second energy storage device is delivered to the load and such that a voltage of the second energy storage device is reduced as the energy stored therein is delivered to the load. The controller is also configured to cause the bi-directional voltage converter to convert a voltage of the first energy storage device to a higher voltage and to deliver the higher voltage to the DC link, wherein the higher voltage is greater than the voltage of the second energy storage device and causes the switch to decouple the second energy storage device from the DC link.

According to yet another embodiment of the invention, a non-transitory computer readable storage medium having a computer program stored thereon and representing a set of instructions that when executed by a computer causes the computer to activate a first switch to transfer a voltage stored in a second energy storage device to a direct current (DC) link coupled to a load such that the voltage stored in the second energy storage device is delivered to the load as a voltage of the second energy storage device is reduced. The instructions also cause the computer to control a bi-directional voltage converter to convert a first voltage of a first energy storage device to a second voltage and to deliver the second voltage to the DC link, wherein the second voltage is greater than the voltage of the second energy storage device and causes the first switch to deactivate.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A system for a vehicle comprising:
   an electric drive for an electromechanical device;
   a direct current (DC) link coupled to the electric drive;
   a bi-directional voltage converter coupled to the DC link, the bi-directional voltage converter comprising a low side and a high side;
   a first energy storage device coupled to the low side of the bi-directional voltage converter;
   a second energy storage device selectively coupled to the DC link on the high side of the bi-directional voltage converter via a switching device, the switching device being a separate component from a voltage converter and being directly coupled between the second energy storage device and the DC link; and
   a controller configured to:
   selectively operate the switching device such that the switching device directly couples the second energy storage device to the DC link during an acceleration mode of operation and a regenerative mode of operation; and
   selectively operate the bi-directional voltage converter to boost a voltage from the first energy storage device such that a voltage of the DC link substantially matches a voltage of the second energy storage device prior to the switching device directly coupling the second energy storage device to the DC link.

2. The system of claim 1, wherein the electromechanical device is a motor.

3. The system of claim 1, wherein the motor is an AC motor and the electric drive comprises a DC/AC converter.

4. The system of claim 1, wherein the first energy storage device is a battery or an ultracapacitor.

5. The system of claim 1, wherein the second energy storage device is a battery or an ultracapacitor.

6. The system of claim 1, wherein the bi-directional voltage converter is a buck/boost converter.

7. The system of claim 1, wherein the switching device comprises a pair of silicon-controlled rectifiers (SCRs) coupled in an anti-parallel arrangement.

8. The system of claim 1, further comprising a dynamic retarder.

9. The system of claim 1, wherein the controller is further configured to operate the bi-directional voltage converter to boost a voltage from the first energy storage device for providing to the electric drive in a motoring mode of operation.

10. The system of claim 1, wherein the controller is further configured to operate the switching device based on the state of charge (SOC) of the second energy storage device.

11. The system of claim 10, wherein the controller is configured to cause the switching device to decouple the second energy storage device from the DC link when the SOC of the second energy storage device falls below a threshold.

12. The system of claim 1, wherein the controller is further configured to cause the switching device to decouple the second energy storage device from the DC link when the acceleration mode is finished.

13. A system for a vehicle comprising:
    an electric drive for an electromechanical device;
    a direct current (DC) link coupled to the electric drive;
    a bi-directional voltage converter coupled to the DC link, the bi-directional voltage converter comprising a low side and a high side;
    a first energy storage device coupled to the low side of the bi-directional voltage converter;
    a second energy storage device selectively coupled to the DC link on the high side of the bi-directional voltage converter via a switching device, the switching device being directly coupled between the second energy storage device and the DC link; and
    a controller configured to:
    selectively operate the switching device such that the switching device directly couples the second energy storage device to the DC link during an acceleration mode of operation and a regenerative mode of operation; and
    selectively operate the bi-directional voltage converter to boost a voltage from the first energy storage device such that a voltage of the DC link substantially matches a voltage of the second energy storage device prior to the switching device directly coupling the second energy storage device to the DC link.

14. The system of claim 13, wherein the electromechanical device is a motor.

15. The system of claim 14, wherein the motor is an AC motor and the electric drive comprises a DC/AC converter.

16. The system of claim 13, wherein the first energy storage device is a battery or an ultracapacitor.

17. The system of claim 13, wherein the second energy storage device is a battery or an ultracapacitor.

18. The system of claim 13, wherein the bi-directional voltage converter is a buck/boost converter.

19. The system of claim 13, wherein the switching device comprises a pair of silicon-controlled rectifiers (SCRs) coupled in an anti-parallel arrangement.

20. The system of claim 13, further comprising a dynamic retarder.

21. The system of claim 13, wherein the controller is further configured to operate the bi-directional voltage converter to boost a voltage from the first energy storage device for providing to the electric drive in a motoring mode of operation.

22. The system of claim 13, wherein the controller is further configured to operate the switching device based on the state of charge (SOC) of the second energy storage device.

23. The system of claim 22, wherein the controller is configured to cause the switching device to decouple the second energy storage device from the DC link when the SOC of the second energy storage device falls below a threshold.

24. The system of claim 13, wherein the controller is further configured to cause the switching device to decouple the second energy storage device from the DC link when the acceleration mode is finished.

25. A method of operating a system for a vehicle, the vehicle including a direct current (DC) link coupled to a high side of a bi-directional voltage converter, a first energy storage device coupled to a low side of the bi-directional voltage converter, and a second energy storage device selectively coupled between the high side of the bi-directional voltage converter and the DC link via a switching device, the switching device being directly coupled between the second energy storage device and the DC link, the method comprising:
selectively operating the switching device such that the switching device directly couples the second energy storage device to the DC link during an acceleration mode of operation and a regenerative mode of operation; and
selectively operating the bi-directional voltage converter to boost a voltage from the first energy storage device such that a voltage of the DC link substantially matches a voltage of the second energy storage device prior to the switching device directly coupling the second energy storage device to the DC link.

26. The method of claim 25, further comprising selectively operating the switching device such that the switching device directly couples the second energy storage device to the DC link when a state of charge (SOC) of the second energy storage device is above a threshold SOC.

27. The method of claim 25, further comprising selectively operating the switching device such that the switching device decouples the second energy storage device to the DC link when a SOC of the second energy storage device is about equal to or below a threshold SOC.

28. The method of claim 25, further comprising selectively operating the switching device such that the switching device decouples the second energy storage device from the DC link when the acceleration mode is finished.

29. The method of claim 25, further comprising selectively operating the switching device such that the switching device decouples the second energy storage device from the DC link when the regenerative mode is finished.

* * * * *

UNITED STATES PATENT AND TRADEMARK OFFICE
CERTIFICATE OF CORRECTION

PATENT NO. : 10,666,045 B2
APPLICATION NO. : 14/728738
DATED : May 26, 2020
INVENTOR(S) : Paul Robert Gemin et al.

Page 1 of 1

It is certified that error appears in the above-identified patent and that said Letters Patent is hereby corrected as shown below:

In the Claims

Claim 3, Column 8 delete "claim 1" and insert --claim 2--.

Signed and Sealed this
Thirtieth Day of June, 2020

Andrei Iancu
*Director of the United States Patent and Trademark Office*